United States Patent
Gam

(10) Patent No.: US 6,540,971 B2
(45) Date of Patent: *Apr. 1, 2003

(54) PROCESS AND REACTOR FOR THE PREPARATION OF AMMONIA

(75) Inventor: Erik A Gam, Hørsholm (DK)

(73) Assignee: Haldor Topsoe A/S, Lyngby (DE)

( * ) Notice: Subject to any disclaimer, the term of this patent is extended or adjusted under 35 U.S.C. 154(b) by 88 days.

This patent is subject to a terminal disclaimer.

(21) Appl. No.: 09/777,097

(22) Filed: Feb. 5, 2001

(65) Prior Publication Data

US 2001/0018039 A1 Aug. 30, 2001

(30) Foreign Application Priority Data

Feb. 10, 2000 (DK) .......................................... 2000 00207
Feb. 17, 2000 (DK) .......................................... 2000 00248

(51) Int. Cl.[7] ................................ C01C 1/04; B01J 8/04
(52) U.S. Cl. ...................... 423/360; 422/148; 422/190; 422/193; 423/361
(58) Field of Search ................................ 422/148, 190, 422/193, 195, 200; 423/360, 361

(56) References Cited

U.S. PATENT DOCUMENTS

| | | | |
|---|---|---|---|
| 3,721,532 A | * 3/1973 | Wright et al. | ............... 423/361 |
| 4,181,701 A | 1/1980 | Topsoe et al. | ............... 422/158 |
| 5,352,428 A | * 10/1994 | Bhakta et al. | ............... 423/360 |
| 6,015,537 A | * 1/2000 | Gam | ........................ 423/360 |

FOREIGN PATENT DOCUMENTS

| | | | |
|---|---|---|---|
| EP | 0873972 | 10/1998 | ............. C01C/1/04 |
| EP | 0931586 | 7/1999 | ............. B01J/8/04 |

* cited by examiner

Primary Examiner—Stanley S. Silverman
Assistant Examiner—Maribel Medina
(74) Attorney, Agent, or Firm—Dickstein Shapiro Morin & Oshinsky LLP

(57) ABSTRACT

Process and reactor for the preparation of ammonia at elevated pressure and temperature in an ammonia reactor, wherein a process stream of ammonia synthesis gas is successively passed through at least three catalyst beds with intermediate cooling of partially reacted synthesis gas leaving the catalyst beds by heat exchange in heat exchangers arranged between each catalyst bed. The process stream is obtained by combining prior to introduction into a first catalyst bed, a first feed stream of synthesis gas having been preheated through indirect heat exchange during the intermediate cooling of the partially converted synthesis gas and a second feed stream of synthesis gas for adjustment of temperature of the process stream. The first feed stream is passed successively through the interbed heat exchangers for cooling the partially converted synthesis gas and space velocity of the synthesis gas is adjusted to be substantially in the same range in all catalyst beds.

3 Claims, 1 Drawing Sheet

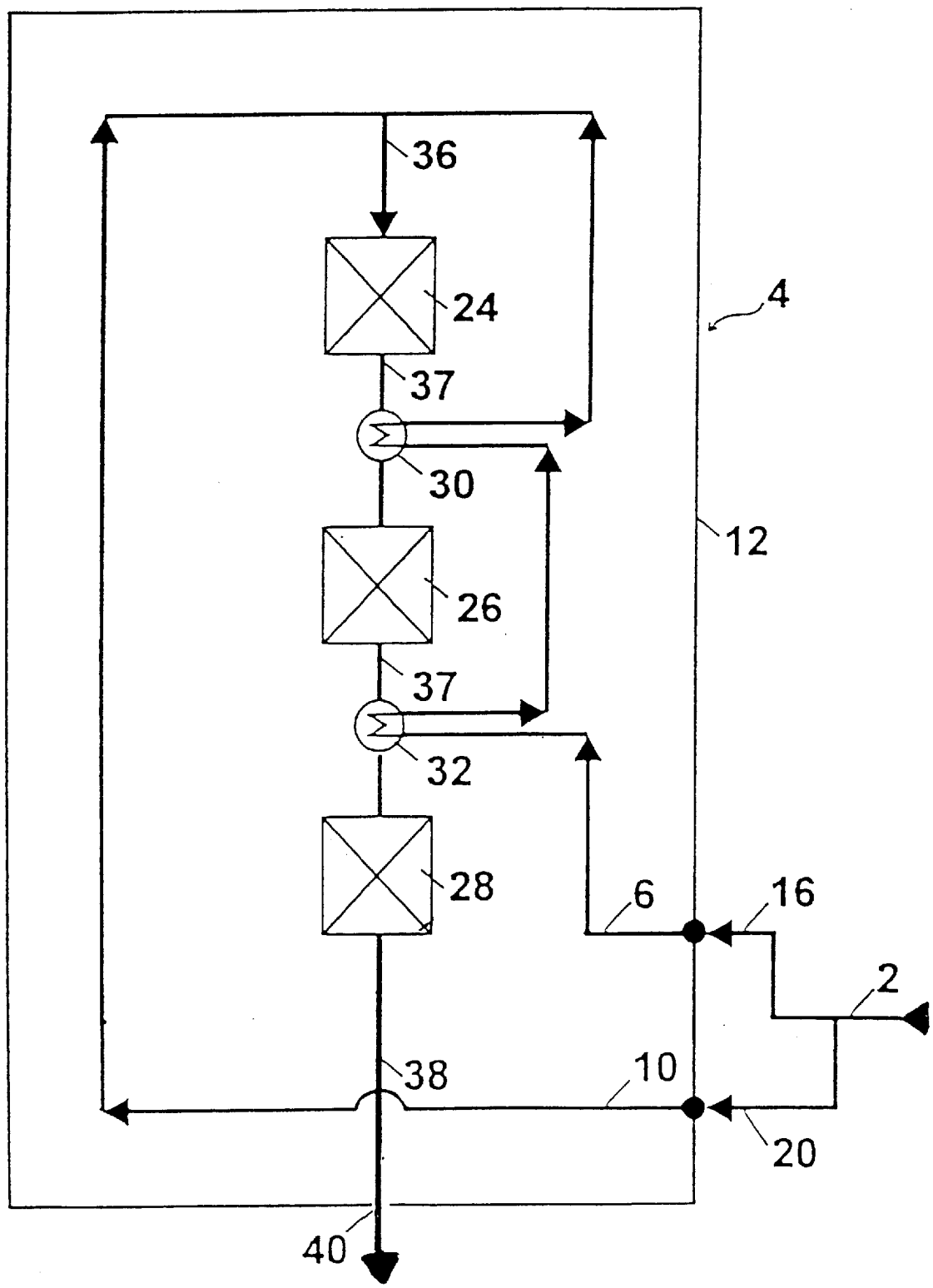
Fig.

PROCESS AND REACTOR FOR THE PREPARATION OF AMMONIA

The present invention relates to a process and reactor for the preparation of ammonia from a synthesis gas comprising nitrogen and hydrogen by passage of the synthesis gas through a number of catalyst beds with intermediate, indirect cooling of partially converted synthesis gas. In particular, the invention concerns an improved process of the above type and an ammonia reactor for use in the process, wherein the synthesis gas is reacted in contact with an iron based ammonia catalyst being arranged in a series of beds with a volume ratio between the first and second bed of nearly equity and with cooling of the partially converted synthesis gas by indirect heat exchange with a single stream of fresh synthesis gas.

Industrial ammonia production from ammonia synthesis gas is most usually carried by contacting the gas with an iron catalyst being arranged in a number of adiabatically operated beds connected in series. Pressure, temperature and space velocity of the synthesis gas (defined as the volume of gas per hour at standard temperature and pressure passed over a unit volume of catalyst) control ammonia concentration in the product effluent gas. Owing a specific reaction kinetic and thermodynamic in the formation of ammonia from hydrogen and nitrogen in contact with an iron based ammonia catalyst, partial reacted synthesis gas must be cooled between each catalyst bed to obtain reasonable reaction yield. A further typical approach in the industry to raise ammonia yield is decreasing the space velocity as the gas passes through a series of catalyst beds by increasing catalyst volume in succeeding beds.

Various types of ammonia converters are known in the art. Frequently employed reactor types are those having a number of catalyst beds with interbed heat exchangers for removing and controlling reaction heat between the beds.

U.S. Pat. No. 4,181,701 discloses an ammonia reactor with a top and a bottom catalyst bed with a central heat exchanger mounted on one of the beds. A process stream of synthesis gas is obtained by combining inside the reactor separate feed streams:
  a shell stream for cooling the reactor shell and cooling the product effluent, an exchange stream for cooling the central heat exchanger, and a by-pass stream for final adjustment of the temperature of the process stream.

Indirect cooling of partially converted ammonia synthesis gas in a reactor with more than two catalyst beds is, furthermore, known in the art and conventionally applied for in the industry.

Thereby, the synthesis gas is indirectly cooled with fresh synthesis gas being passed in a number of separate streams to heat exchangers between the catalyst beds. The streams are introduced through separate pipe connections mounted on the reactor shell.

The major drawback of the known ammonia preparation processes and reactors with intermediate cooling of partially converted synthesis gas in a number of interbed heat exchangers with separate gas streams is the need for numerous inlet means and complicated ducting in the ammonia reactor.

An ammonia production process and reactor of the above type with simplified gas handling and ducting is mentioned in EP-A-873,972. By the process and reactor of this patent publication, a process stream is obtained by combining prior to introduction into a first catalyst bed, a first feed stream of synthesis gas having been preheated through indirect heat exchange during the intermediate cooling of the partially converted synthesis gas, a second feed stream of synthesis gas having been preheated by indirect heat exchange with the product effluent, and a third feed stream of synthesis gas for adjustment of temperature of the process stream. The first feed stream is passed successively through the interbed heat exchangers for cooling the partially converted synthesis gas.

The above mentioned known ammonia reactors and processes are operated on conventional iron based catalysts with a main constituent of magnetite being reduced during operation to the catalytically active form of alpha-iron.

Recently, ammonia catalysts with high activity composed of ruthenium on graphite support have been employed in a number of industrial ammonia reactors. The main advantage of ruthenium ammonia catalysts is a higher volumetric activity and less catalyst volume required for product yields comparable to those obtained by use of the conventional iron catalyst. In EP-A-931,586 an ammonia reactor is disclosed with a top and central catalyst bed being loaded with conventional iron ammonia catalyst and a bottom catalyst with less volume than the top and central bed being loaded with ruthenium-on-carbon catalyst. A process stream of ammonia synthesis gas is in the above indirectly cooled reactor obtained by combining three separate inlet streams upstream the top catalyst bed.

Though the high activity ruthenium based ammonia catalysts allow reduction of catalyst volume, the main disadvantage of ruthenium based catalysts is less mechanical stability and considerably higher costs, which are not sufficient to compensate for the reduced catalyst volume necessary in the application of these catalysts.

It has now been found that gas handling and ducting in multibed ammonia processes and reactors with indirect cooling of the process gas and being operated on conventionally iron ammonia catalysts are still improved at comparative ammonia product yield, when reducing the number of separate synthesis gas inlet streams in the formation a process gas steam and through adjustment of process gas space velocity in the different catalyst beds.

SUMMARY OF THE INVENTION

Pursuant to the above finding, this invention is a process for the preparation of ammonia at elevated pressure and temperature in an ammonia reactor comprising passing a process stream of ammonia synthesis gas successively through at least three catalyst beds and reacting the synthesis gas in the beds;
  intermediately cooling of partially reacted synthesis gas leaving the catalyst beds by heat exchange in heat exchangers arranged between each catalyst bed and withdrawing a product effluent being rich in ammonia, wherein the process stream is obtained by combining prior to introduction into a first catalyst bed, a first feed stream of synthesis gas having been preheated through indirect heat exchange during the intermediate cooling of the partially converted synthesis gas and a second feed stream of synthesis gas for adjustment of temperature of the process stream, the first feed stream is passed successively through the interbed heat exchangers for cooling the partially converted synthesis gas and wherein space velocity of the process gas in the second catalyst bed is between 0.65 and 2.00 times of the space velocity in the first catalyst bed.

Furthermore, the invention provides an ammonia reactor for use in the above process with simplified inlet and piping means for distribution of fresh synthesis gas serving as cooling medium in indirect heat exchange with partially reacted synthesis gas between each catalyst bed.

Thus, an ammonia reactor according to the invention, comprises within a cylindrical pressure shell at least a top, a second and a bottom catalyst bed vertically arranged around a common axis and connected in series;
   intermediate heat exchanging means arranged between each catalyst bed for intermediate cooling of a partially converted ammonia synthesis gas from the catalyst beds by indirect heat exchange with a first feed stream of fresh ammonia synthesis gas;
   inlet means for introducing the first feed stream and inlet means for introducing a second feed stream into the reactor;
   means for passing the first and the second feed stream to the top catalyst bed; and
   means for combining the feed streams to a process stream prior to introduction of the process stream into the top catalyst bed, wherein the means for passing the first feed stream consists of a passageway for connecting in series the intermediate heat exchangers and for passing the first stream from the inlet means consecutively through the intermediate heat exchanging means to the means for combining the feed streams and wherein volume ratio between the second catalyst bed and the top catalyst bed is between 0.5 and 1.5.

DETAILED DESCRIPTION OF THE INVENTION

The invention will be explained in more detail in the following description by reference to the drawings, in which the sole FIGURE shows in pure schematic form a sectional view of an ammonia reactor according to a specific embodiment of the invention.

When operating the invention, fresh ammonia synthesis gas 2 is introduced into an ammonia reactor 4 being constructed according to a specific embodiment of the invention. The synthesis gas is introduced in two separate feed streams 6 and 10 through inlets 16 and 20 arranged in shell 12 of the reactor. Reactor 4 comprises within the shell a top catalyst bed 24, a second catalyst bed 26 and a bottom catalyst bed 28. Between beds 24 and 26 and between beds 26 and 28 heat exchangers 30 and 32 are arranged for cooling a partly converted process stream 37 leaving beds 24 and 26. Fresh synthesis gas is passed in process stream 36 to bed 24 and partly converted in bed 24. The partly converted synthesis gas is then passed in process stream 37 successively through beds 26 and 28. By passage through the beds nitrogen and hydrogen in the stream react exothermically to ammonia. An ammonia rich product effluent 38 is withdrawn from the reactor through outlet 40.

As mentioned hereinbefore, the reaction between hydrogen and nitrogen proceeds exothermically in the catalyst beds and the temperature of the process stream rises. Because of thermodynamically reasons the temperature of process stream 37 has to be lowered, prior to being introduced into beds 26 and 28. The stream is therefore cooled in heat exchangers 30 and 32 by indirect heat exchange with feed stream 6, being passed in series through heat exchangers 32 and 30.

By passage through the heat exchangers feed stream 6 is preheated by indirect heat exchange as described above. The preheated feedstream is then combined with fresh synthesis gas stream 10 to process stream 36 upstream top catalyst bed 24. The temperature of process stream 36 is adjusted by addition of the cold stream 10.

In the above reactor, the reaction temperature in first and second catalyst bed 24 and 26, respectively, is determined by the flow ratio between the inlet streams 6 and 10. The temperature of the fresh synthesis gas in stream 2 controls the temperature at inlet to bottom catalyst bed.

It is not possible in an ammonia reactor with more than two catalyst beds to control the inlet temperature in the second catalyst bed with the above two streams within an optimum temperature.

In the process and reactor according to the invention deviation from optimum temperature in the second catalyst beds, however, will only have a minor impact on ammonia product yield with a volume ratio or space velocity between the first and second catalyst bed as specified hereinbefore and further shown in the following Example.

EXAMPLE

A reactor as shown in the FIGURE and explained in detail in the above description with a fixed size of pressure shell was operated at four different volume ratios between the first and second catalyst bed of the reactor. In the experiments volume ratio of the first and second catalyst bed was between 0.5 and 3.0. For each volume ratio, a first experiment was conducted, whereby the inlet temperature to the second catalyst bed was adjusted to result in a maximum product yield. In the following experiments the inlet temperature into the second catalyst was varied between values above and below the optimum operation temperature and product yield determined for each volume ratio. The above conditions and results obtained thereby are summarised in the Table below.

To compare impact of temperature deviation on product yield at each volume ratio with product yield at the optimum temperature the yield at the optimum temperature is 100%.

TABLE

| Dev from optimium inlet temp. | −20 | −16 | −11 | 0 | 11 | 16 | 20 |
|---|---|---|---|---|---|---|---|
| Prod rate, MTPD | | | | | | | |
| Bed2/Bed1 = 0.50 | 1539.3 | 1541.9 | 1544.4 | 1547.0 | 1544.3 | 1541.2 | 1538.0 |
| Bed1/Bed2 = 0.80 | 1543.4 | 1547.0 | 1550.6 | 1554.2 | 1550.6 | 1546.7 | 1542.7 |
| Bed2/Bed1 = 1.00 | 1543.4 | 1547.9 | 1552.6 | 1557.0 | 1552.7 | 1548.0 | 1543.4 |
| Bed2/Bed1 = 1.50 | 1538.4 | 1544.6 | 1550.9 | 1557.1 | 1551.4 | 1545.9 | 1541.2 |
| Bed2/Bed1 = 2.00 | 1524.0 | 1534.5 | 1543.9 | 1553.0 | 1547.4 | 1541.8 | 1533.6 |
| Bed2/Bed1 = 3.00 | 1498.6 | 1510.6 | 1522.7 | 1534.0 | 1525.2 | 1517.0 | 1509.4 |
| Prod. rate, % | | | | | | | |
| Bed2/Bed1 = 0.50 | 98.9 | 99.0 | 99.2 | 99.4 | 99.2 | 99.0 | 98.8 |
| Bed1/Bed2 = 0.80 | 99.1 | 99.4 | 99.6 | 99.8 | 99.6 | 99.3 | 99.1 |
| Bed2/Bed1 = 1.00 | 99.1 | 99.4 | 99.7 | 100.0 | 99.7 | 99.4 | 99.1 |

TABLE-continued

| Dev from optimium inlet temp. | −20 | −16 | −11 | 0 | 11 | 16 | 20 |
|---|---|---|---|---|---|---|---|
| Bed2/Bed1 = 1.50 | 98.8 | 99.2 | 99.6 | 100.0 | 99.6 | 99.3 | 99.0 |
| Bed2/Bed1 = 2.00 | 97.9 | 98.6 | 99.2 | 99.7 | 99.4 | 99.0 | 98.5 |
| Bed2/Bed1 = 3.00 | 96.2 | 97.0 | 97.8 | 98.5 | 98.0 | 97.4 | 96.9 |

As apparent from the above results, decrease of product yield at deviation from the optimum operation temperature in the second catalyst bed is less severe in a reactor or process having a distribution of catalyst volume in the second and first bed between 0.5 and 1.5 according to the invention compared to the results obtained with a reactor and process operating with a corresponding catalyst volume ratio of between 2.0 and 3.0 as known in the art and generally employed in ammonia industry. As a further advantage, product yield is increased when sizing the first and second catalyst according to the invention with the above volume ratio of between 0.5 and 1.5. At a volume ratio of between 1.0 and 1.5, the product yield in tons per day at optimum temperature conditions is about 2% higher compared to the optimum yield obtained at a typical employed catalyst volume ratio of 3.0.

What is claimed is:

1. Process for the preparation of ammonia at elevated pressure and temperature in an ammonia reactor, comprising passing a process stream of ammonia synthesis gas successively through at least three beds with an iron based ammonia formation catalyst and reacting the synthesis gas in the beds;

intermediately cooling of partially reacted synthesis gas leaving the catalyst beds by heat exchange in heat exchangers arranged between each catalyst bed and withdrawing a product effluent being rich in ammonia, wherein the process stream is obtained by combining prior to introduction into a first catalyst bed, a first feed stream of synthesis gas having been preheated through indirect heat exchange during the intermediate cooling of the partially converted synthesis gas and a second feed stream of synthesis gas for adjustment of temperature of the process stream, the first feed stream is passed successively through the interbed heat exchangers for cooling the partially converted synthesis gas and wherein space velocity of the process gas in a second catalyst bed is between 0.65 and 2.00 times of the space velocity in the first catalyst bed.

2. Ammonia reactor comprising within a cylindrical pressure shell at least a top, a second and a bottom catalyst bed loaded with an iron based ammonia formation catalyst and vertically arranged around a common axis and connected in series;

intermediate heat exchanging means arranged between each catalyst bed for intermediate cooling of a partially converted ammonia synthesis gas from the catalyst beds by indirect heat exchange with a first feed stream of fresh ammonia synthesis gas;

inlet means for introducing the first feed stream and inlet means for introducing a second feed stream into the reactor;

means for passing the first and the second feed stream to the top catalyst bed; and means for combining the feed streams to a process stream prior to introduction of the process stream into the top catalyst bed, wherein the means for passing the first feed stream consists of a passage-way for connecting in series the intermediate heat exchangers and for passing the first stream from the inlet means consecutively through the intermediate heat exchanging means to the means for combining the feed streams and wherein volume ratio between the second catalyst bed and the top catalyst bed is between 0.5 and 1.5.

3. Ammonia reactor of claim 2, wherein the pressure shell is a shell of an existing ammonia reactor.

* * * * *